US006534939B2

(12) United States Patent
Kato et al.

(10) Patent No.: US 6,534,939 B2
(45) Date of Patent: Mar. 18, 2003

(54) OPEN/CLOSE CONTROL DEVICE FOR MOVABLE LID

(75) Inventors: Hideharu Kato, Tokyota (JP); Kiyoshi Okamoto, Hekinan (JP); Takashi Kikuta, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/805,577

(22) Filed: Mar. 14, 2001

(65) Prior Publication Data

US 2002/0024308 A1 Feb. 28, 2002

(30) Foreign Application Priority Data

Mar. 14, 2000 (JP) ........................................ 2000-070339

(51) Int. Cl.[7] .............................. B60J 7/057; E05F 15/14
(52) U.S. Cl. ........................ 318/266; 318/434; 318/469
(58) Field of Search ................................ 318/264, 265, 318/266, 283, 286, 434, 466–470, 484

(56) References Cited

U.S. PATENT DOCUMENTS 6,034,495 A * 3/2000 Tamagawa et al. ......... 318/266

6,051,945 A * 4/2000 Furukawa ................... 318/280
6,183,040 B1 * 2/2001 Imaizumi et al. ........... 296/155

FOREIGN PATENT DOCUMENTS

| JP | 5-25686 | 4/1993 |
| JP | 10-109534 | 4/1998 |

* cited by examiner

Primary Examiner—Bentsu Ro
(74) Attorney, Agent, or Firm—Burns, Doane, Swecker & Mathis, LLP

(57) ABSTRACT

An open/close control device for a movable lid is of a highly precise position detection ability by using only a sensor which issues a pulse train in response to a motor rotation amount. When the open/close control device is in the form of a drive unit 3 which controls opening and closing a sunroof, the drive unit 3 includes a motor 3 which drives the sunroof and a control device 10 having a microcomputer 13. The microcomputer 13 is fed with two pulse train signals from two Hall-ICs, respectively. The signals are in proportion to the rotation number of the motor 4 but are different in phase. On the basis of the pulse train signals, the microcomputer 13 counts a position counter 13 for indication of current position of the sunroof in view of the motor rotation direction.

14 Claims, 13 Drawing Sheets

Fig. 4b

Closing Direction

| | 1 | 2 | 3 | 4 | 5 | 6 | 7 | 8 | 9 | 10 | 11 |
|---|---|---|---|---|---|---|---|---|---|---|---|
| Hall-IC 11 | ← | H | → | L | ← | H | → | L | ← | H | → |
| Hall-IC 12 | L | ← | H | → | L | ← | H | → | L | ← | H |

Opening Direction

| | ① | ② | ③ | ④ | ⑤ | ⑥ | ⑦ | ⑧ | ⑨ | ⑩ | ⑪ |
|---|---|---|---|---|---|---|---|---|---|---|---|
| Hall-IC 11 | ← | H | → | L | ← | H | → | L | ← | H | → |
| Hall-IC 12 | H | → | L | ← | H | → | L | ← | H | → | L |

OPEN/CLOSE CONTROL DEVICE FOR MOVABLE LID

This application is based on and claims priority under 35 U.S.C. §119 with respect to Japanese Application No. 2000-070339 filed Mar. 14, 2000, the entire content of which is incorporated herein by reference.

BACKGROUND OF THE INVENTION

1. Field of the Invention

The present invention is directed to an open/close control device for movable lids such as a sunroof panel and a power-operated window pane which are provided at vehicular openings, respectively.

2. Prior Art

Sometimes an automotive vehicle is provided with an open/close control device which moves, in response to a driver's switch manipulation, a sunroof panel or a power-operated window pane for opening/closing an opening of an automotive vehicle. For example, Japanese Patent Publication No.Hei.5(1993)–25686 discloses a sunroof open/close control device which moves a sunroof panel to tilt open/close and to slide open/close. In addition, a recent open/close control device has a sandwiched condition prevention function to stop or reverse a sunroof panel or a power-operated window pane when something, such as a part of human body or an object, is held between the vehicular opening and a moving sunroof panel or a moving power-operated window pane.

In the open/close control device of the type for controlling movement of a lid, such as a sunroof panel or a power-operated window pane, detecting a position of the lid is required. A conventional lid position detection method is to count a number of edges of a pulse train signal which is output from a Hall-IC (i.e. rotation number sensor) which senses a magnet rotating together with an output shaft of an electric motor. With this method, an ON-and-OFF condition of a relay is monitored. The relay controls normal direction rotation, reverse direction rotation, and termination of the electric motor. A lid position detection is made by clocking a position counter based upon the change in the ON-and-OFF condition of the relay. In addition, as Japanese Patent laid-open Print No.Hei.10(1998)-109534 discloses, a lid position detection device is provided which operates without employing a Hall-IC. In this lid position detection device, detecting the position of the lid (i.e. sunroof panel) is made by counting the number of edges of a ripple pulse signal which is obtained by shaping a signal detected from a current flowing through a DC motor. In this device, in order to recognize the direction of the lid, the foregoing concept is employed.

However, in the conventional lid position detecting method or device, the timing of stopping or reversing the lid (i.e. sunroof panel or power-operated window pane) is determined upon issue of a motor stop instruction or a motor reverse instruction by monitoring the change of ON-and-OFF condition of the relay. Thus, after recognition of the actual termination or reverse rotation of the motor, the motor continues to rotate due to inertia for a predetermined period of time. Sometimes the resultant rotation number may not be reflected on the indication of the position counter. In addition, an unexpected noise which is superposed on the pulse train signal may be mistakenly counted.

In view of such circumstances, conventionally, in addition to the sensor or Hall-IC which generates the pulse train signal, a position detection switch is provided which detects absolute position of the sunroof panel such that a signal issued from the position detection switch corrects or amends the indication of the position counter which indicates the position of the sunroof panel. In particular, a position correction sensor, such as the position detection switch, is frequently placed away from the motor and/or control unit. Thus, a harness, which is of a long length, is required in addition to the position detection sensor. Thus, separate preparations of the sensor such as Hall-ICs and the position correction sensor increase the number of parts (i.e. sensors and harness) to be mounted to the vehicle body. Therefore, the open/close control device is made complex and large-sized, the contents of the control becomes very complex, and the production productivity is lowered due to increasing the number of parts to be assembled.

Thus, a need exists to provide, for overcoming the aforementioned problems, an open/close control device for a movable lid which is highly precise in position detection of the lid using only a sensor which issues a pulse train signal in response to the rotation number of a motor.

SUMMARY OF THE INVENTION

The present invention has been developed to satisfy the request noted above. A first aspect of the present invention provides an open/close control device for a movable lid which opens and closes an opening. The control device includes a) a motor for driving the lid, b) a pair of rotation number detection sensors which generate pulse train signals, respectively, the pulse train signals being of a frequency which is in proportion to a rotation number of the motor but having a different phase, and c) position detection means for determining a movement direction of the lid and for detecting a position of the lid based on the pulse train signals, respectively. The position detection means is operated to continue the detection of the position of the lid as long as the motor is rotated by inertia after the motor is deenergized for stopping the movement of the lid.

In accordance with the first aspect of the present invention, on the basis of the pulse train signals issued from the pair of the rotation number sensors, respectively, which are out of phase, the direction of the movement of the lid is determined and the current position of the lid is detected. Even though an order is issued to stop driving the motor (e.g. a switch of the motor is shifted to a stop position), position detection continues as long as the motor is believed to rotate due to inertia. Thus, it is possible to precisely detect the position of the lid.

A second aspect of the present invention is to provide an open/close control device as a limited version of the first aspect, wherein the position detection means continues to detect the position of the lid in a positive direction of the motor unless a movement in a reverse direction of the lid is detected, when the motor is driven to move the lid in the reverse direction.

In accordance with the second aspect of the present invention, in addition to the operation and advantages in the first aspect, even though the motor is driven to reverse the direction of movement of the lid, the position detection means continues to detect the position assuming that the lid is moving in a positive direction as long as the reverse movement of the lid is not detected. Upon detection of the reverse movement of the lid, the position counting is initiated in the reverse direction.

A third aspect of the present invention is to provide an open/close control device for a movable lid which opens and closes an opening. The control device includes a) a motor for driving the lid, b) a pair of rotation number detection sensors which generate pulse train signals, respectively, the pulse train signals being of a frequency which is in proportion to a rotation number of the electric motor having a different phase, and c) position detection means for determining a movement direction of the lid and for detecting a position of the lid based on the pulse train signals, respectively. The position detection means determines that the pulse train signal, which is used for detecting the reverse movement of the lid, is a noise when a) the motor is ordered to stop or to move in a positive direction and b) the reverse movement of the lid is detected by the position detection means.

In accordance with the third aspect of the present invention, based on the pulse train signals issued from the pair of the rotation number sensors, respectively, which are out of phase, the direction of the movement of the lid is determined and the current position of the lid is detected. If the reverse movement of the lid is found despite no command to the motor for reversing the direction of movement of the lid, the pulse train signal used for the reverse detection is treated as a noise. Thus, determining the precise position of the lid can be made.

A fourth aspect of the present invention is to provide an open/close control device for a movable lid which opens and closes an opening. The control device includes a) a motor for driving the lid, b) a pair of rotation number detection sensors which generates pulse train signals, respectively, the pulse train signals being in proportion to a rotation number of the electric motor but being out of phase, and c) position detection means for determining a movement direction of the lid and for detecting a position of the lid based on the pulse train signals, respectively. The position detection means includes clocking means for counting a cycle of the pulse train signal. The position detection means operates such that the pulse train signal is treated as a noise when the cycle of the pulse train signals is found to be smaller than a predetermined value.

In accordance with the fourth aspect of the present invention, based on the pulse train signals issued from the pair of the rotation number sensors, respectively, which are out of phase, the direction of movement of the lid is determined and the current position of the lid is detected. The pulse train signal is treated as a noise when the cycle of the pulse train signal, which is measured by the clock means, is found to be less than a predetermined value. Thus, it is possible to avoid an unexpected indication of the position of the lid caused by noise or by mistake, resulting in very precise detection of the position of the lid.

A fifth aspect of the present invention is to provide an open/close control device as an improved version of any one of the first, second, third, and fourth aspects of the present invention, which further comprises a sandwiched condition detection means for detecting a sandwiched condition caused between the lid and an object based on the pulse train signal.

In accordance with the fifth aspect of the present invention, in addition to the operation and advantages of any one of the first aspect, second aspect, third aspect, and fourth aspect, based on the pulse train signal, the sandwiched condition detection means detects a sandwiched condition which makes it possible to use the rotation number sensor instead of preparing a sensor for only detecting the sandwiched condition.

A sixth aspect of the present invention is to provide an open/close control device as a limited version of the fifth aspect, wherein the lid is a sunroof panel of a vehicle which opens and closes an opening of a vehicle roof.

In accordance with the sixth aspect of the present invention, the sandwiched condition can be established.

A seventh aspect of the present invention is to provide an open/close control device as a limited version of the fifth aspect, wherein the sandwiched condition detection means recognizes the sandwiched condition if a subsequent edge of the pulse train signal fails to appear within a time duration after a detection of an edge of the pulse train signal.

In accordance with the seventh aspect, even though the cycle of the pulse train signal can not be obtained due to a fully locked condition of the electric motor, the sandwiched condition can be accurately detected.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which;

FIG. 3(*b*) illustrates a perspective view of the sunroof when it is in fully opened condition;

FIGS. 4*a* and 4*b* illustrate a comparative chart when two pulse train signals are issued from different Hall-ICs;

DETAILED DESCRIPTION OF THE PRESENT INVENTION

A preferred embodiment of the present invention which is in the form of a vehicular sunroof opening/closing control device will be detailed hereinbelow with reference to FIGS. 1 to 12 inclusive.

Figure 3A:
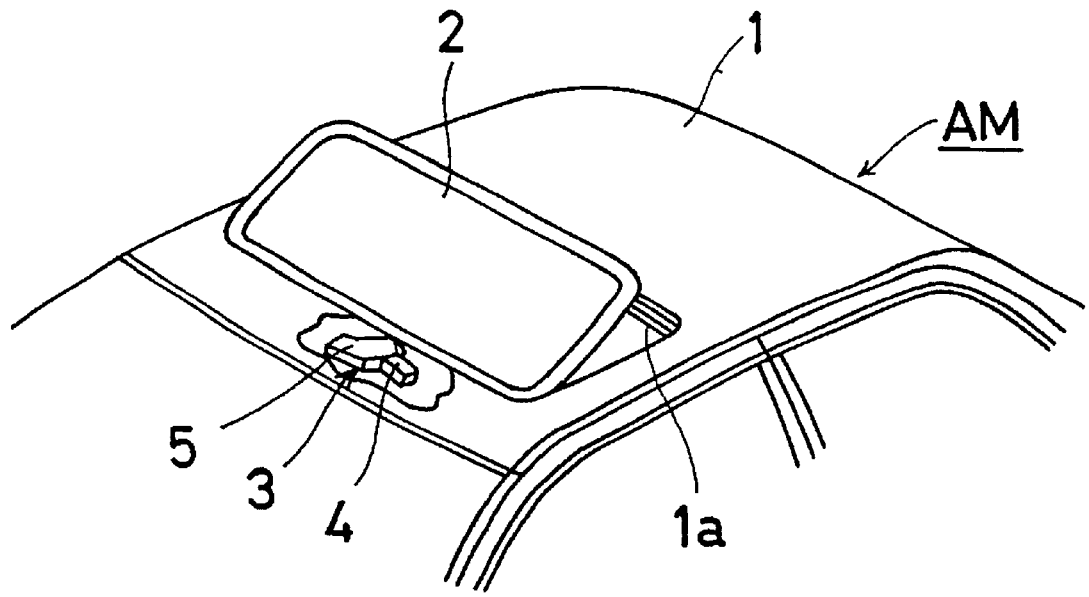
FIG. 3(*a*) illustrates a perspective view of a sunroof when it is in its tilt-up condition.
Figure 3B:
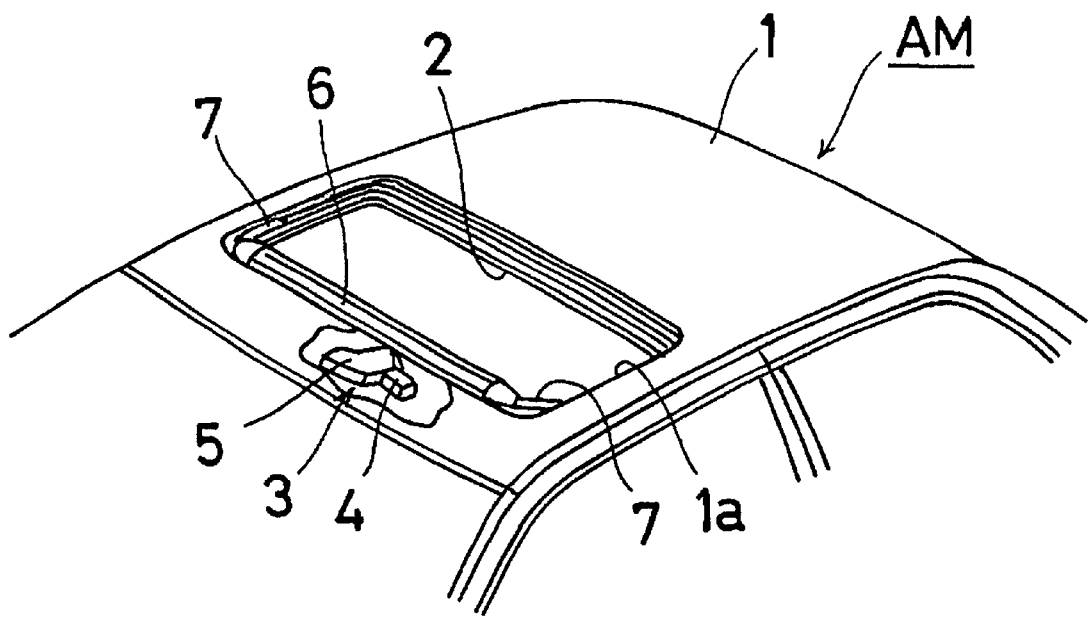

First of all, referring to FIGS. 3(*a*) and 3(*b*), there is illustrated a sunroof opening/closing control device which is provided in a roof 1 of an automotive vehicle AM. The roof 1 is formed therein with an opening 1*a*. The roof 1 is also provided with a movable sunroof panel 2, which is in the form of a transparent roof glass, in order to close or open the opening 1*a*. The sunroof panel 2 acts as a lid or panel. The sunroof panel 2 is capable of being moved or slid in a vehicle lengthwise direction when a well-known slide mechanism (not shown) is actuated. The sunroof panel 2 is also brought into a tilted position when a well-known tilt mechanism (not shown) is driven. A drive unit 3, which is in the form of a gear assembly, is embedded in the roof 1 at a front side of the opening 1a. The drive unit 3 is in the form of an assembly of an electric motor 4 and a gear unit 5. An output shaft of the gear unit 5 is associated with the slide mechanism and the tilt mechanism. When the motor 4 is turned on, according to the driver's selection, the sunroof panel 2 is operated in a tilt open/close mode or in a slide open/close mode. In the tilt open/close mode, the sunroof panel 2 is brought into a tilted position between a tilt-up position (FIG. 3(a)) and a fully closed position. In the slide open/close mode, the sunroof panel 2 is moved between the fully closed position and fully opened position (FIG. 3(b)). In the present embodiment, if the motor 4 is turned on in a normal or positive direction when the sunroof panel 2 is at its tilt-up position, the sunroof panel 2 is brought into a tilt-down position to close the opening 1a fully and subsequently is slid in the rear direction to open the opening 1a fully. If the motor 4 is turned on in a reverse or negative direction when the sunroof panel 2 is at its fully opened position, the sunroof panel 2 moves in the direction which is opposite to the aforementioned movement when the motor 4 is turned on in the normal direction.

As can be seen from FIG. 3(b), at a front edge of the opening 1a, there is provided or placed a wind deflector 6. The wind deflector 6 is supported by a pair of laterally spaced arms 7 and 7 such that the wind deflector 6 is urged by a spring (not shown) to raise up. When the sunroof panel 2 opens the opening 1a, the wind deflector 6, which is under urging of the spring, is automatically extended outside the opening 1a. When the sunroof panel 2 is moved to close the opening 1a, the resulting sunroof panel 2 urges the arms 7 and 7 against the spring urging force to accommodate the wind deflector 6 within the opening 1a.

Figure 1:
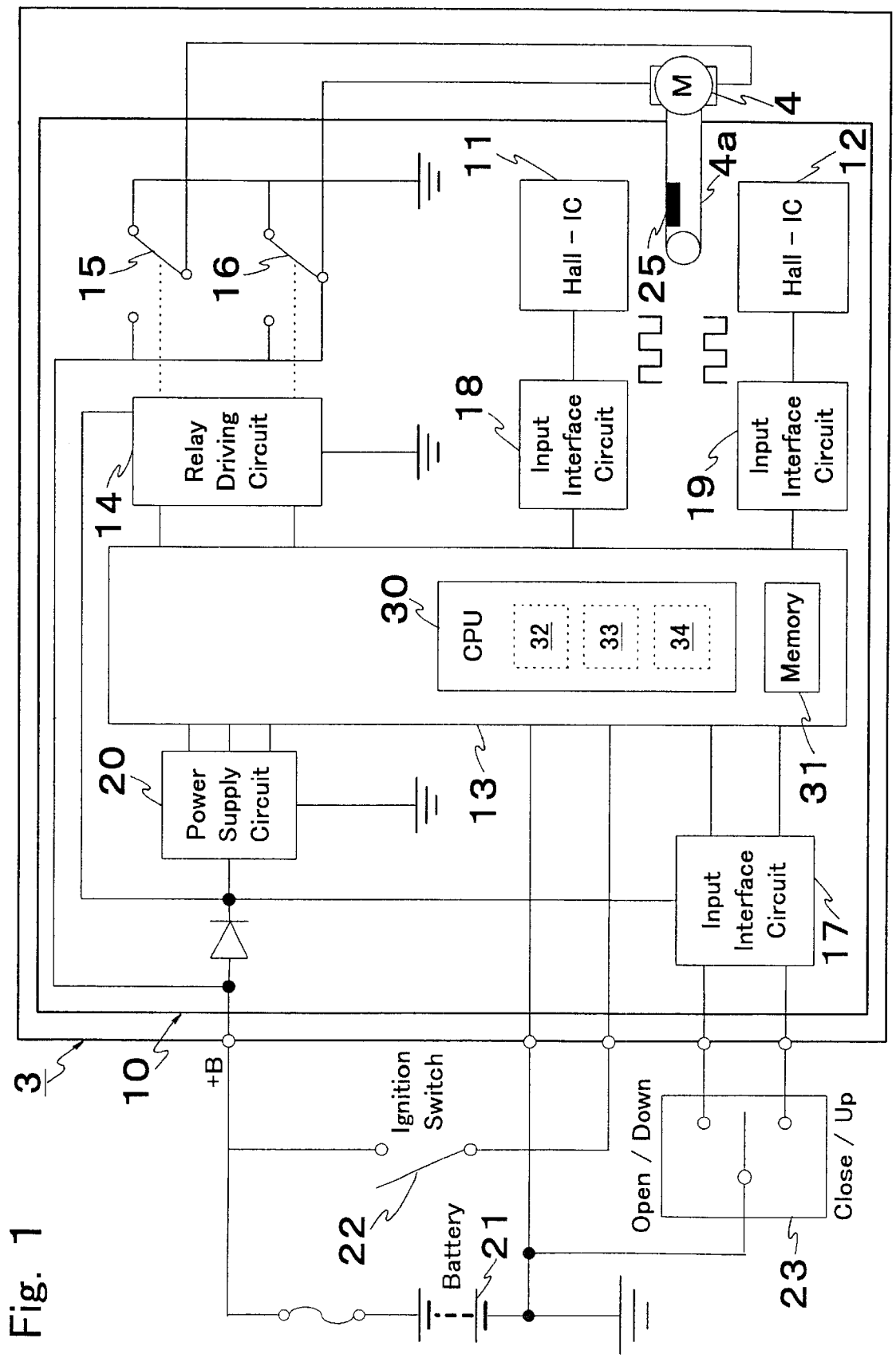
FIG. 1 illustrates a block diagram of a sunroof opening/closing control device according to an embodiment of the present invention.

Referring now to FIG. 1, there is depicted a block diagram of the sunroof opening/closing control device. The drive unit 3 includes a controller (i.e. control circuit substrate) 10. The controller 10 is made up of a) a pair of Hall-ICs 11 and 12 each of which acts as a rotation number sensor, b) a microcomputer 13 as position detection means and sandwiched detection sensing means, c) a relay driving circuit 14, d) relays 15 and 16, e) various kinds of interface circuits 17, 18, and 19, f) an electric power supply circuit 20, and other elements.

A positive terminal of an on-vehicle mounted battery 21 is connected to the electric power supply circuit 20, the relay driving circuit 14, and other circuits. The battery 21 applies a fixed amount of driving voltage to the microcomputer 13 and the Hall-ICs 11 and 12. A signal is output from an ignition switch 22 to the microcomputer 13. Within a compartment of the automotive vehicle AM, there is provided or installed an operation switch 23 which operates in such a manner that an open/down switch is closed when the operation switch 23 is shifted to one direction, a close/up switch is closed when the operate on switch 23 is shifted to the other direction, and both of the open/down and close/up switches are opened when the operation switch 23 takes a neutral position. One of the signals which are issued from the operation switch 23 is input to the microcomputer 13 by way of the input interface circuit 17, which causes the microcomputer 13 to order the relays 15 and 16 through the relay driving circuit 14 to control the motor 4 in response to the content of the signal from the operation switch 23.

Figure 4A:
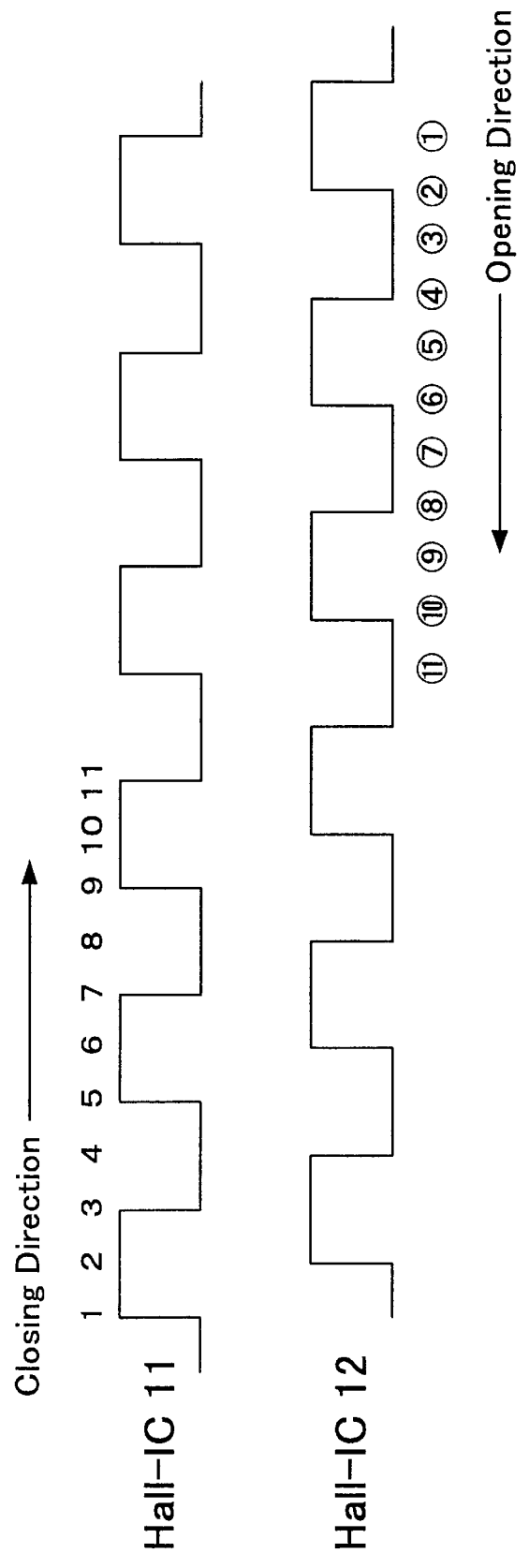

A magnet 25 is fixedly mounted on a rotation or output shaft 4a of the electric motor 4. When the motor 4 is driven, magnetic flux changes which transverses each of the Hall-ICs 11 and 12 and the resultant output signal is output from the Hall-IC 11 (12) to the microcomputer 13 by way of an input interface circuit 18 (19). In the present embodiment, the Hall ICs 11 and 12 are arranged to obtain characteristics or ratings as depicted in FIG. 4(a). Based on the pulse train signal output from each of the Hall-ICs 11 and 12, the microcomputer 13 detects a current position of the sunroof panel 2. In the present embodiment, no sensors are used for position correction. In addition, the present embodiment employs a sandwiched condition prevention function, which reverses the sunroof panel 2 through a distance of e.g. about 20 cm by reversing the motor 4. Detection of the sandwiched condition is made by sensing a change of the load applied to the motor 4. The sandwiched condition indicates that an object or a part of human body is nipped by the sunroof panel 2. A control procedure for such a sandwiched condition prevention function is also made at the microcomputer 13 based on the pulse train signals output from the respective Hall-ICs 11 and 12 to the microcomputer 13.

The microcomputer 13 includes a built-in CPU 30 and a memory 31. The memory 31 stores program data whose routines are depicted in FIG. 5 through FIG. 12, respectively. The CPU 30 executes, according to these programs, a driving operation procedure for the motor 4, a position detection procedure of the sunroof panel 2, and a sandwiched condition prevention procedure. The CPU 30 has a position counter 32, and timer counters 33 and 34 as clocking means. The position counter 32 is designed for determining the current position of the sunroof panel 2, in view of the rotation direction of the motor 4, by counting the number of pulses (i.e., pulse edges in the present embodiment) of the pulse train signal which is input from each of the Hall-ICs 11 and 12. The timer 33 is designed for counting a pulse interval time (i.e. an interval between two adjacent pulse edges) in the pulse train signal. The timer 33 is used for the detection of the sandwiched condition and others. The timer 34 is used for counting a time elapsed after the driving operation of the motor 4 is terminated.

Figure 2:
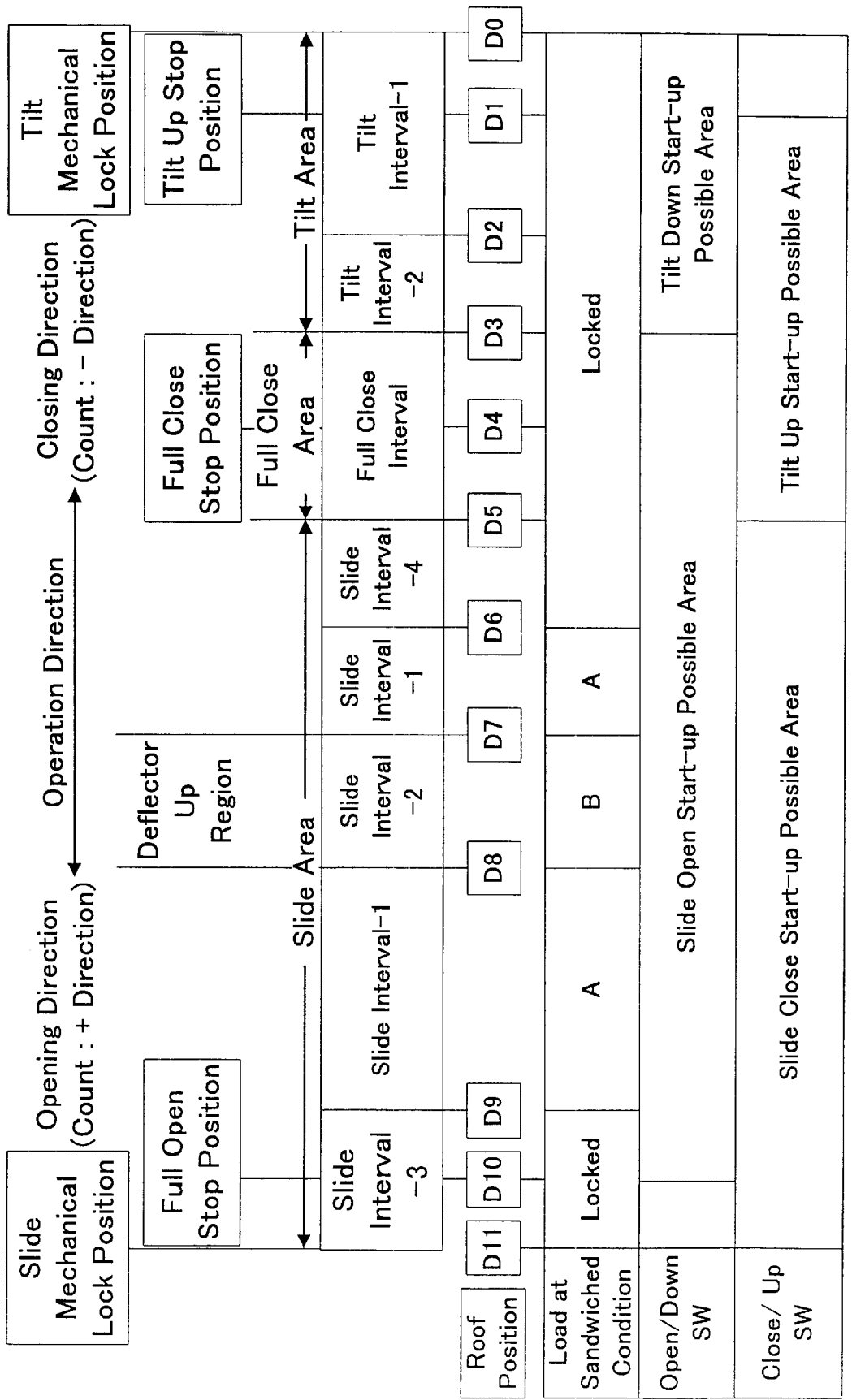
FIG. 2 illustrates a chart for explaining an example of the device shown in FIG. 1.

FIG. 2 shows set examples of control positions of the sunroof panel 2 and sandwiched condition threshold (load).

The sunroof panel 2 is movable between a tilt locked position (i.e. a position at which the sunroof panel 2 is mechanically in a fully tilt open position against a stopper) and a slide locked position (i.e. a position at which the sunroof panel 2 is mechanically in a fully slide open position against a stopper). Between the tilt locked position and the slide locked position, an opening is defined to be opened and closed by the sunroof panel 2. A position at which a driving rod (not shown) is in its fully pulled position by the motor 4 (the fully rotated position in a reverse direction) is in coincidence with the tilt locked position, while a position at which the driving rod is in its fully pushed position by the motor 4 (the fully rotated position in a normal direction) is in coincidence with the slide locked position.

Between the slide locked position and the tilt locked position, positions D0 through D11 which appear, as control positions, in this order when the motor 4 is driven in its normal direction. The positions D11 and D0 denote the respective slide locked tilt and locked positions. A tilt area is defined between the positions D0 and D3. A fully closed area to defined by the positions D3 and D5. A slide area is defined between the positions D5 and D11. The position D1, the position D4, and the position D10 are defined as tilt-up stop position, a fully closing movement stop position, and a fully opening movement stop position, respectively and are used as target stop positions during control. For example, the fully closing movement position D4 is an on-control target stop position and as long as the current position of the sunroof panel 2 falls in the fully closed area, defined between the positions D3 and D5, the sunroof panel 2 is regarded to be in its fully closed position. As apparent from the depiction shown in FIG. 2, the tilt area is divided into a tilt interval-1 and a tilt interval-2, the fully closed area has only one fully closed interval, and the slide area is divided into a slide interval-4, slide interval-1, slide interval-2, slid interval-1, and slide interval-3. Each of the positions other than positions D1, D4, and D10 is indicative of a boundary between two adjacent intervals. Each of the positions D0 through D11 has its own number to be counted by the position counter 32. The number of the position counter 32 is designed for making an increment (counting: '+') and a decrement (counting: '−') when the motor 4 is driven in a normal direction (reverse direction) for the opening (closing) direction of the sunroof panel 2.

In addition, as can be seen from FIG. 2, the sandwiched load (sandwiched condition threshold value) is set for each of the areas at which a sandwiched condition detection is required. In the present embodiment, between the positions D6 and D9, executing the sandwiched condition detection is required. In the slide interval-1 (between the positions D6 and D7/between positions D8 and D9), the sandwiched condition threshold value is set to be 'A', while in the slide interval-2 (i.e. deflector urging-down interval) the sandwiched condition threshold value is set to be 'B' which is larger than the value 'A' due to the fact that when the sunroof panel 2 is closed a surplus force is required to urge the deflector 6 down against the urging force of the spring. The sandwiched condition prevention function is in a locked condition (i.e. null or invalid) when there is no occurrence of the sandwiched condition (such as pinching of finger by the sunroof panel 2) i.e. while the sunroof panel 2 is in the interval between the positions D0 and D6 and the interval between the positions D10 and D11 (i.e. slide interval-3, slide interval-4, fully closing movement interval, tilt interval-1, and tilt interval-2). In addition, in each of the slide interval-3 and the slide interval-4, the sandwiched condition prevention function is in a locked condition (i.e. null or invalid) in order to prevent a load resistance, between the moving sunroof panel 2 and a sealing member which is at an inner periphery of the opening 1a, from being mistakenly recognized as a sandwiched condition.

The detection of the sandwiched condition is made by measuring the decreased amount of the rotation speed of the motor 4. This is based on a load which results from a sandwiched condition causes the moving speed of the sunroof panel 2 to decrease. In detail, a pulse cycle is calculated based on the pulse edge time interval. If the pulse cycle is found to be in excess of the threshold value, the sandwiched condition is acknowledged. Each of the threshold values 'A' and 'B' is set to correspond to the pulse cycle when the sunroof panel 2 is applied with a load from the sandwiched condition. Each of the threshold values is determined such that the battery voltage is used as a parameter since the speed of the motor 4 depends on the battery voltage. It is to be noted that another method can be employed to detect a sandwiched condition when a monitored changing rate of the pulse cycle is found to be much larger than the threshold value.

The CPU 30 monitors the current condition (On condition or OFF condition) of each of the relays 15 and 16 to recognize whether the motor 4 is operating in a normal direction or a reverse direction or is at rest. That is to say, the CPU 30 recognizes that the motor 4 is in an at rest mode or in a reverse mode based on the current condition (On condition or OFF condition) of each of the relays 15 and 16. In addition, in the present embodiment, recognizing the rotation direction of the motor 4, which is required for counting the position counter 32, is made such that the number of pulses of the pulse train signals output from the pair of Hall-ICs 11 and 12 are compared for determining the actual rotation direction of the motor 4. On the basis of the resultant or recognized direction, the position counter 32 is incremented or decremented.

FIGS. 4a and 4b show each timing chart for the pulse train signals from the respective Hall-ICs 11 and 12.

As can be seen from FIG. 4(a), the pulse train signals issued from the respective Hall-ICs 11 and 12 are identical in cycle but are out of phase by a quarter cycle. FIG. 4(1)) indicates that the relationships between pulse train signals issued from the respective Hall-ICs 11 and 12 differ between level and edge depending on the moving direction of the sunroof panel 2. Thus, the motor rotation direction can be determined based on the relationship between level and edge of each of the pulse train signals. It is to be noted that in FIG. 4(b) reference codes '↑' and '↓' denote the rising edge and the falling edge, respectively.

Figure 5:
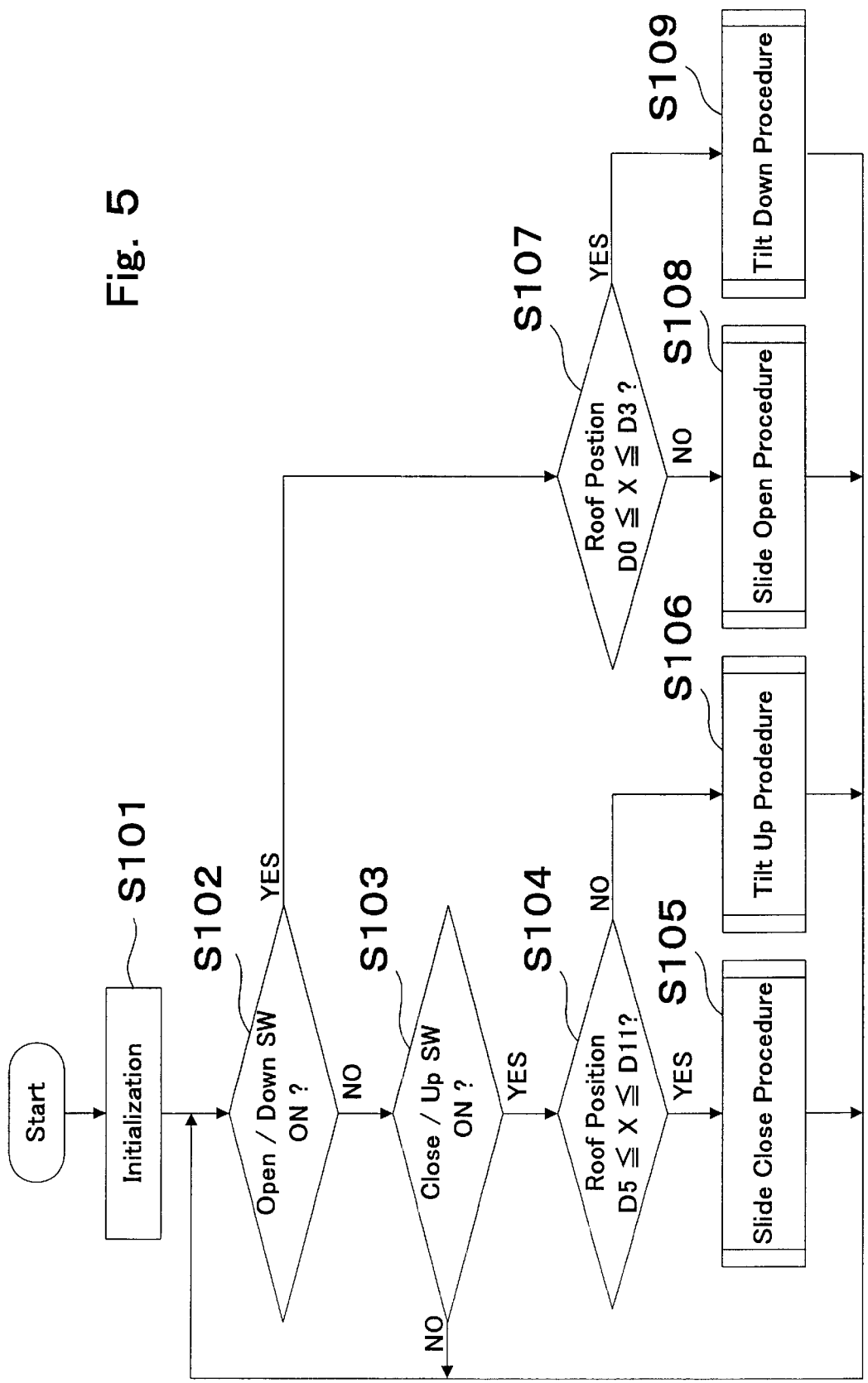
FIG. 5 illustrates a flowchart showing a main routine.
Figure 6:
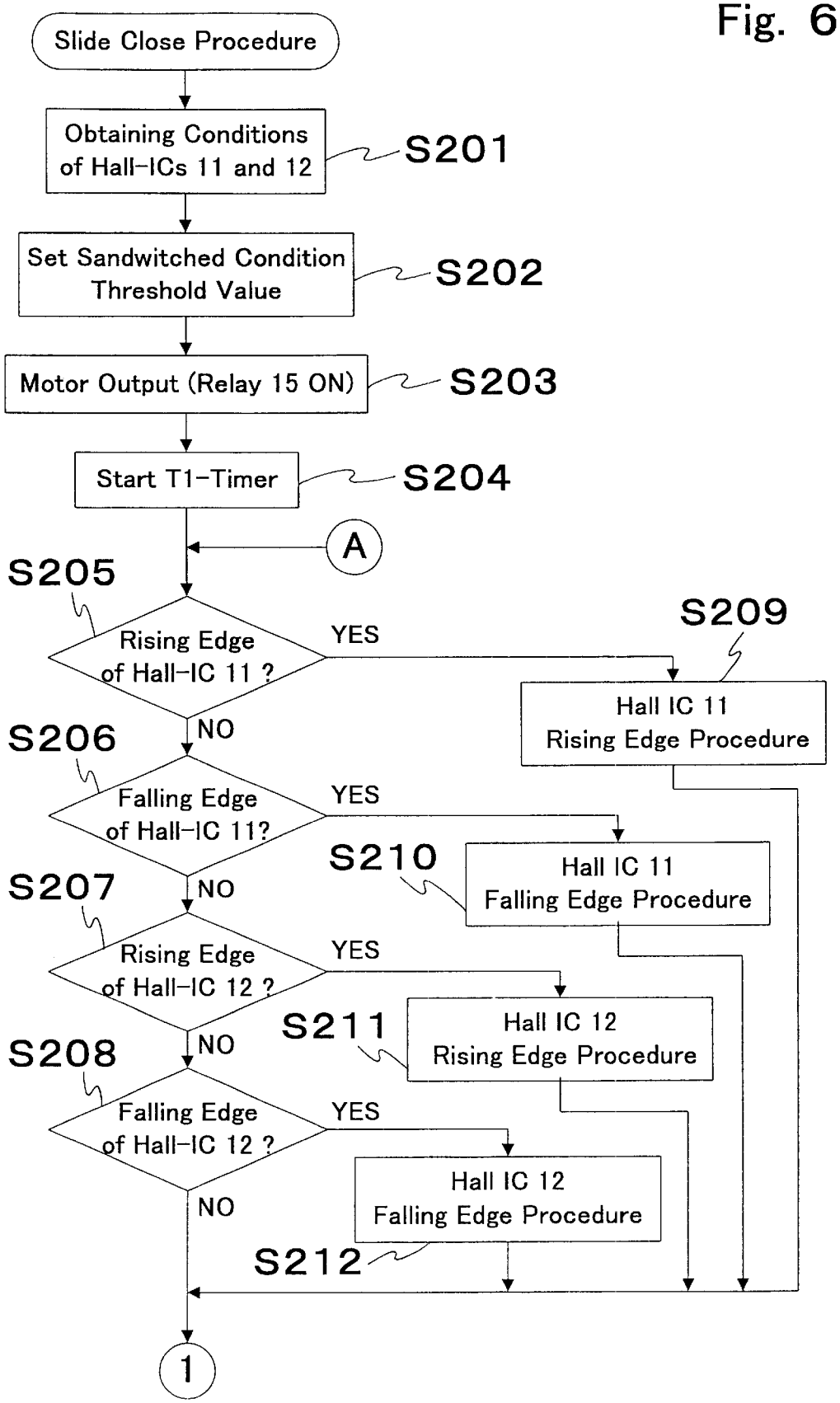
FIG. 6 illustrates a flowchart showing a slide close routine.
Figure 7:
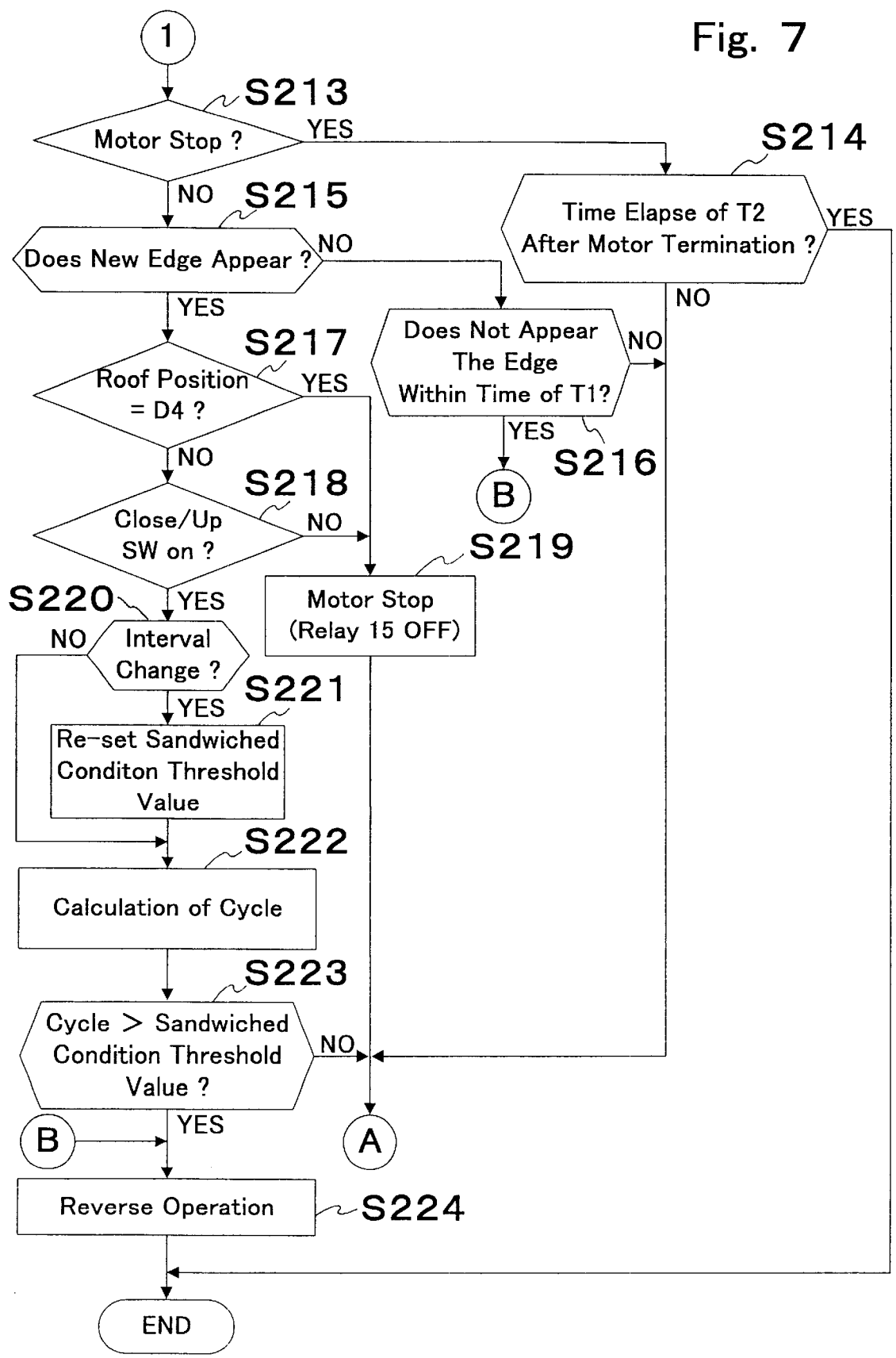
FIG. 7 illustrates a flowchart which is a part of the flowchart shown in FIG. 6.
Figure 8:
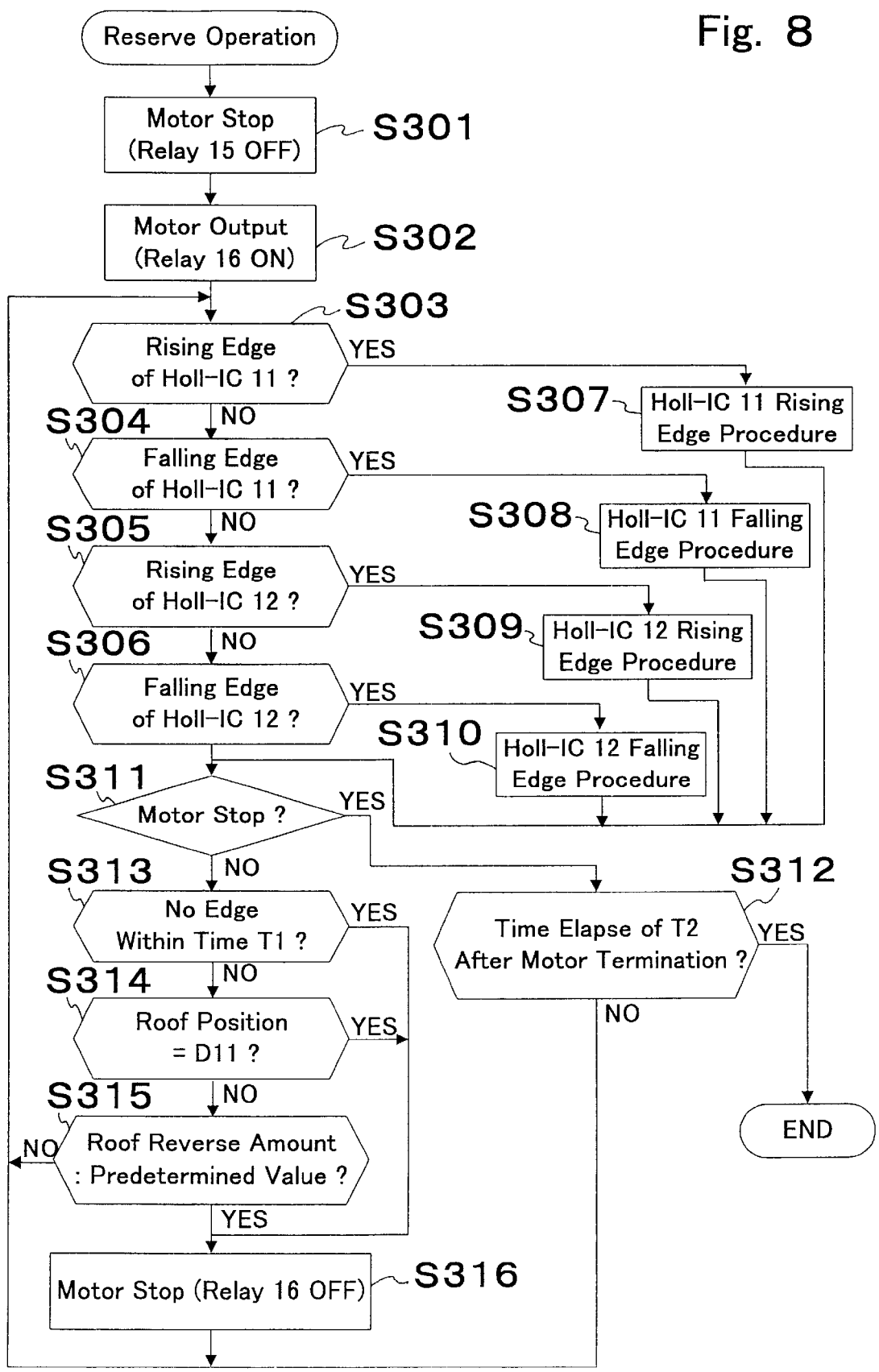
FIG. 8 illustrates a flowchart which shows a reverse operation routine.
Figure 9:
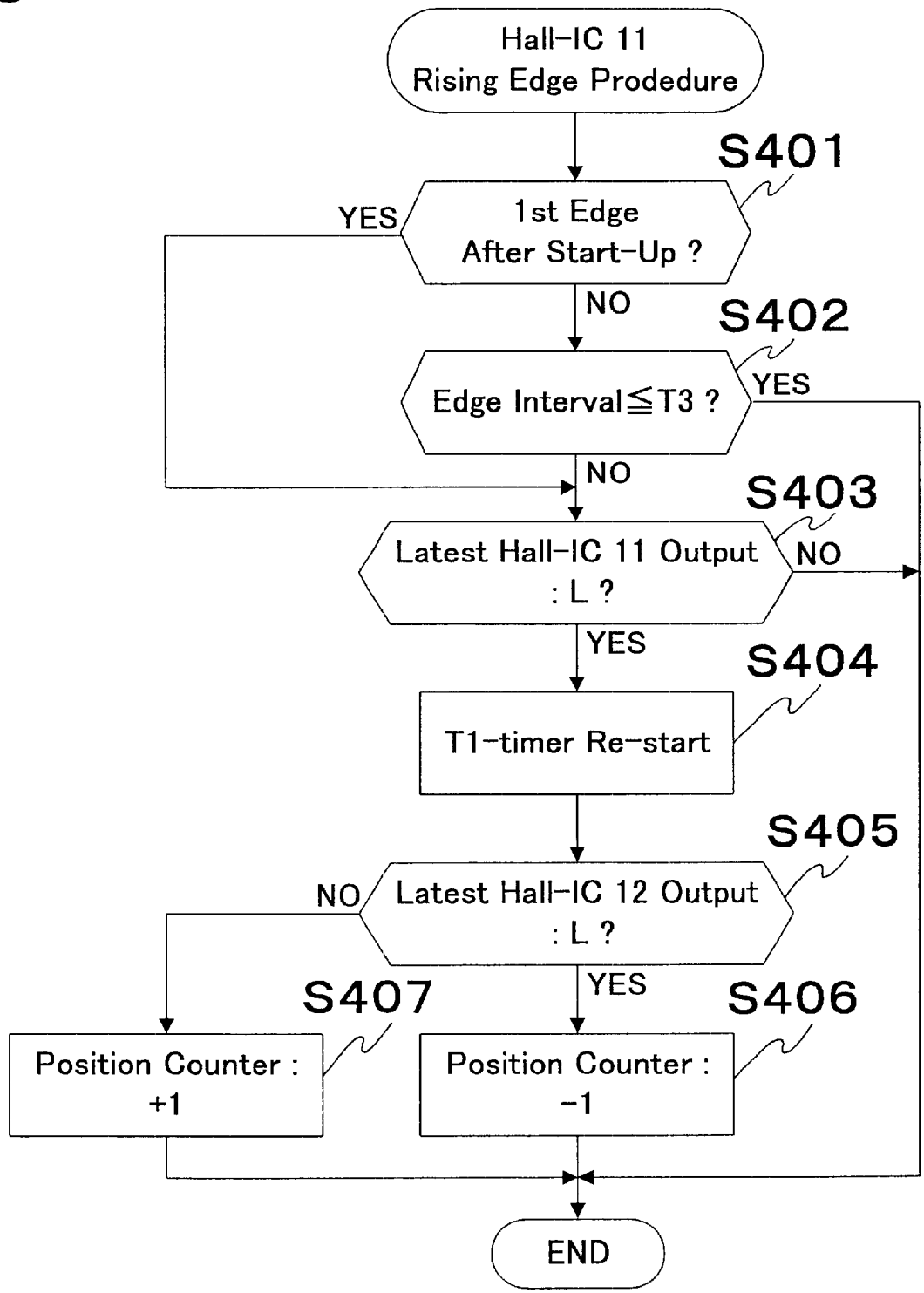
FIG. 9 illustrates a rising edge processing routine of a first Hall-IC.
Figure 10:
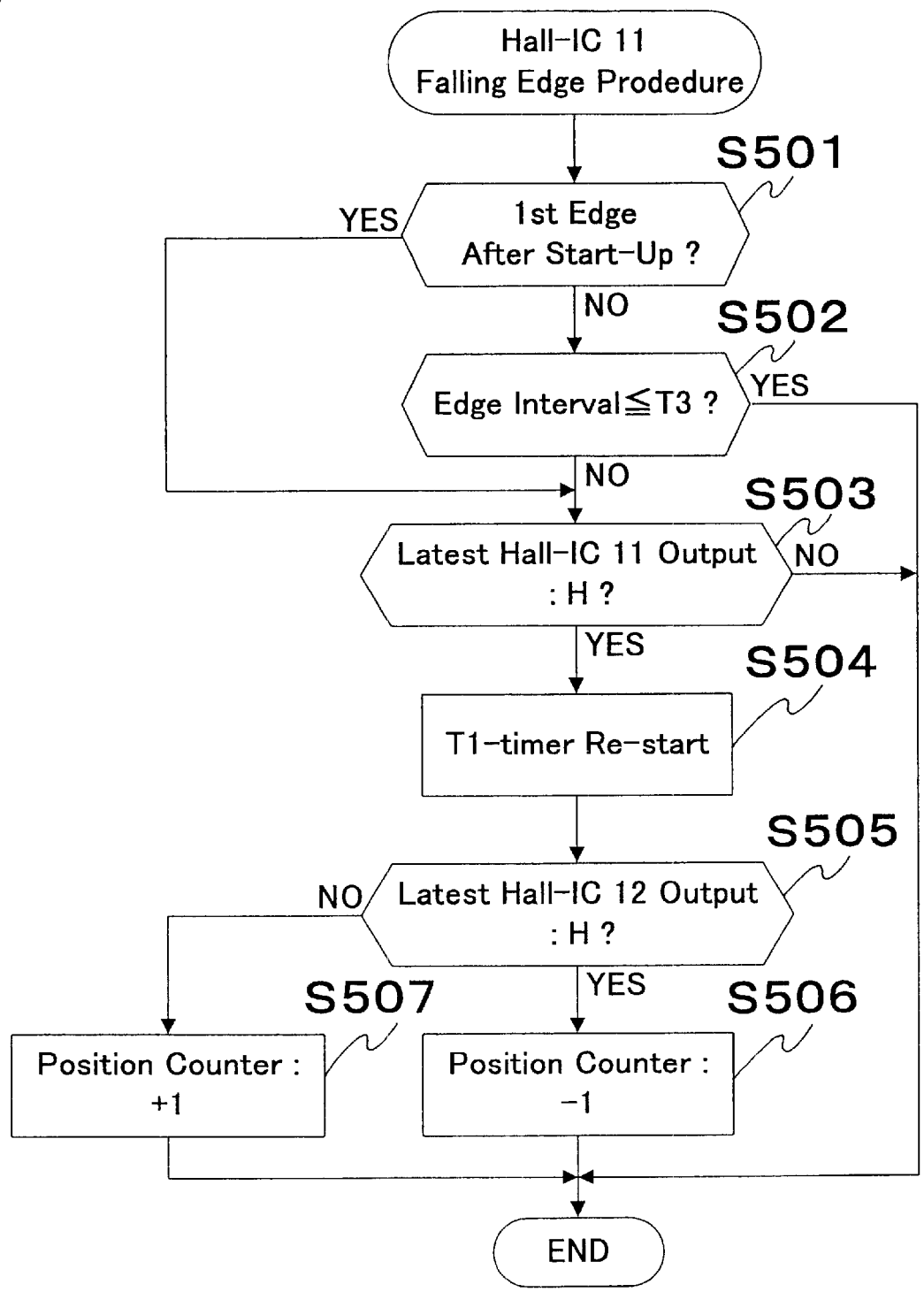
FIG. 10 illustrates a falling edge processing routine of the first Hall-IC.
Figure 11:
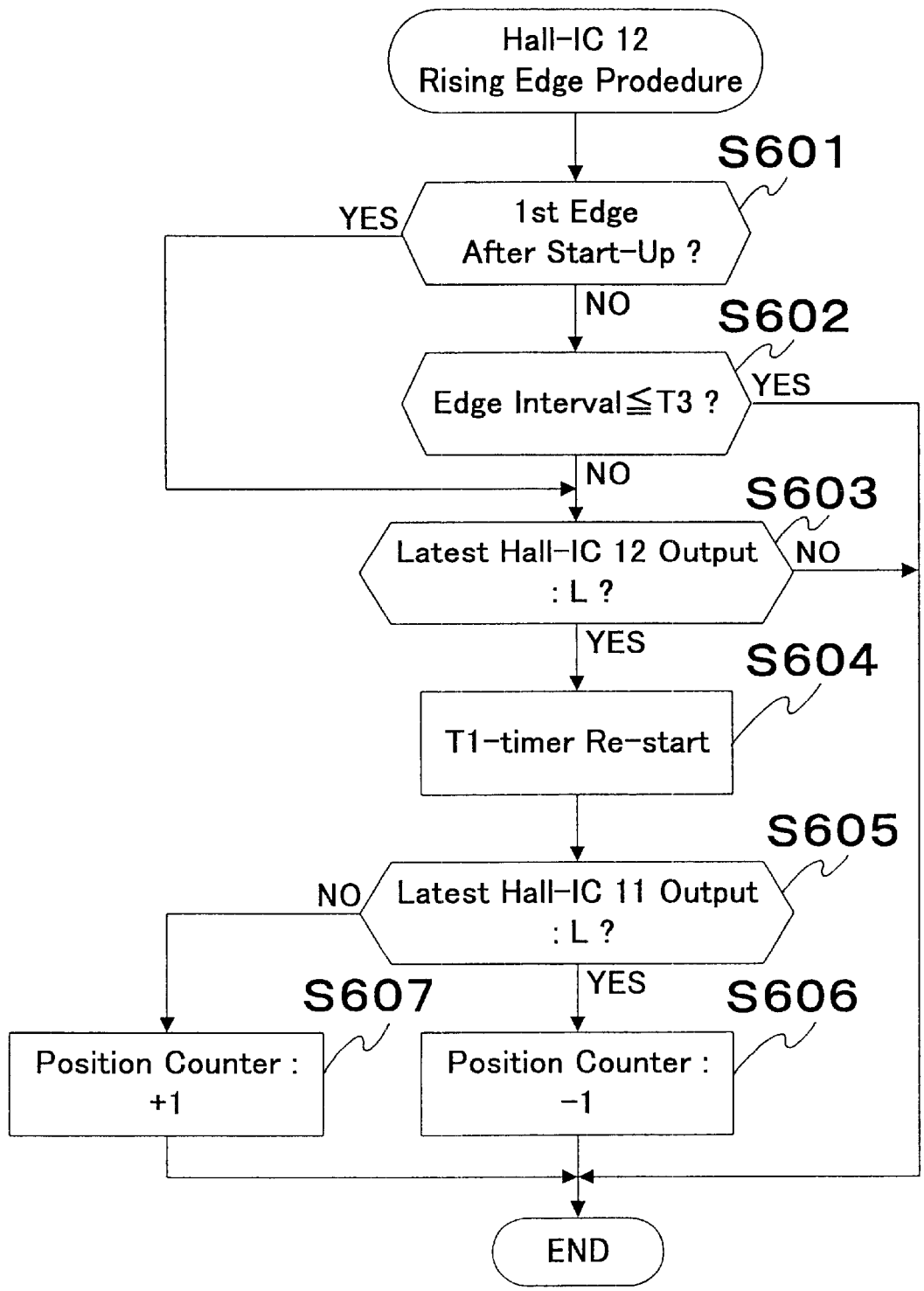
FIG. 11 illustrates a rising edge processing routine of a second Hall-IC.
Figure 12:
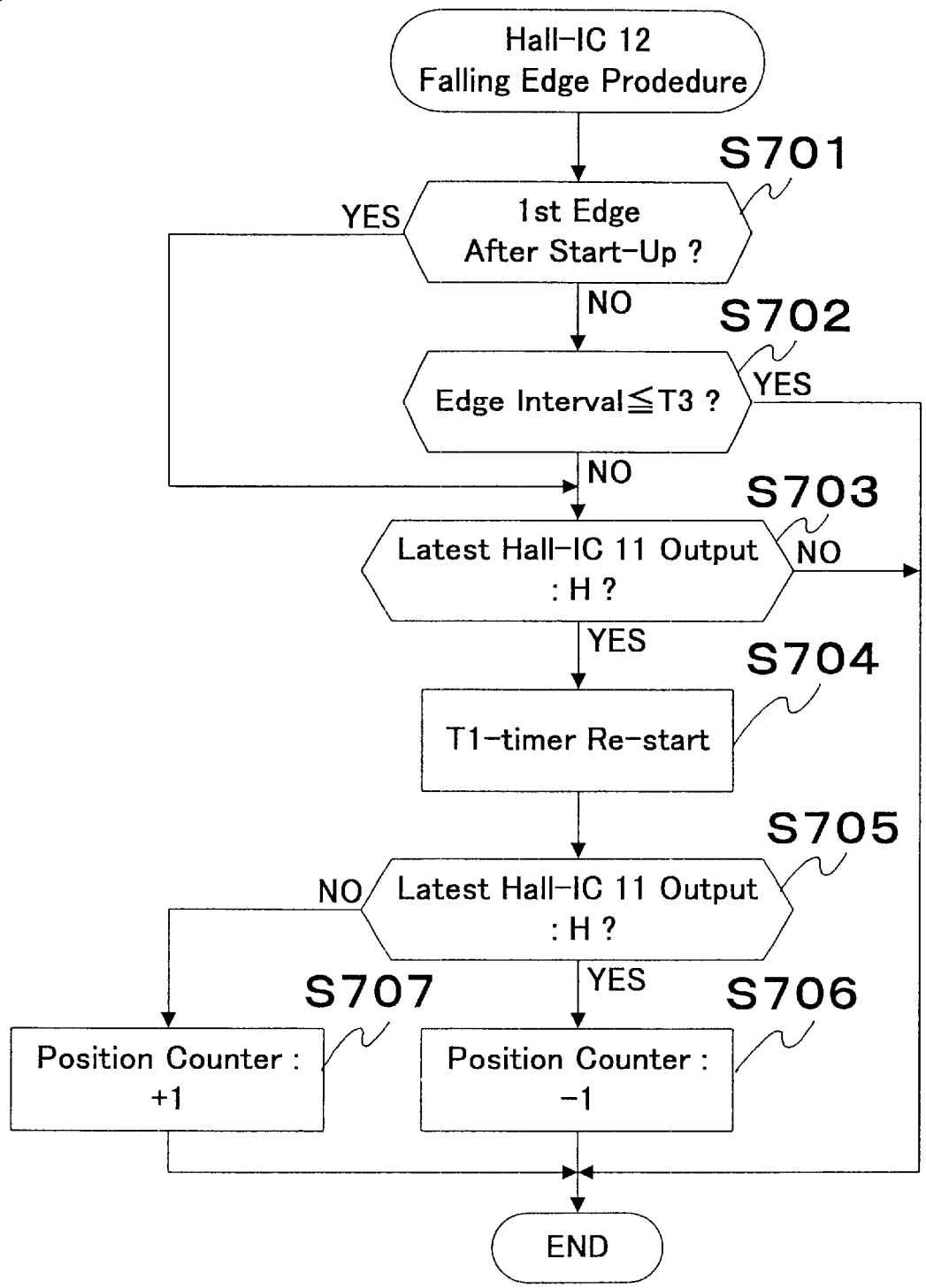
FIG. 12 illustrates a falling edge processing routine of the second Hall-IC.

The programs which are stored in the memory 31 and whose routine are represented by the flowcharts shown in FIGS. 5 through 12 are directed to a position detection procedure and sandwiched condition control. FIG. 5 illustrates a flowchart showing a main routine, FIG. 6 illustrates a flowchart showing a slide close routine, FIG. 7 illustrates a flowchart which is a part of the flowchart shown in FIG. 6, FIG. 8 illustrates a flowchart which shows a reverse operation routine, FIG. 9 illustrates a rising edge processing routine of the Hall-IC 11, FIG. 10 illustrates a falling edge processing routine of the Hall-IC 11, FIG. 11 illustrates a rising edge processing routine of the Hall-IC 12, and FIG. 12 illustrates a failing edge processing routine of the second Hall-IC 12.

Hereinafter, the programs are explained with reference to FIGS. 5 through 12.

Referring to FIG. 5 which illustrates the flowchart of a main routine, at step S101, the memory 31 of the microcomputer 13, ports, and other are initialized.

At step S102, whether the open/down switch is closed is determined. If the result is true, the control (i.e. the program) goes to step S107 to check the current position X of the sunroof panel 2. That is to say, if the current position X of the sunroof panel 2 falls between D0 and D3 (i.e. D0≦X≦D3), the sunroof panel 2 is found to be within the tilt interval-1 or the tilt interval-2, which causes the program to go to step S109 for executing the tilt-down procedure. If the current position X of the sunroof panel 2 is found not to meet the formula of D0≦X≦D3, the sunroof panel 2 is found to be within the fully closed interval or slide interval, which causes the program to go to step S108 for executing the slide open procedure.

At step S102, if the open/down switch is found to be OFF, the program control goes to step S103 in order to check whether the close/up switch is ON If the result indicates that the close/up switch is OFF, the program returns to step S102. If the result indicates that the close/up switch is ON, the program goes to step S104 for determining the next operation of the sunroof panel 2 depending on the current position X thereof. If the current position X of the sunroof panel 2 falls between D5 and D11 (i.e. D5≦X≦D11), the sunroof panel 2 is found to be within the slide interval, which causes the program to go to step S105 for executing the slide close procedure. If the result of Step S104 is false, the sunroof panel 2 is within the fully closed interval or the tilt interval, which causes the program to go to step S106 for executing the tilt up procedure. After one of steps S105 through S108 is completed, the program returns to step S102.

Next, with reference to FIGS. 6 and 7, the slide close procedure at step S105 will be explained as an example of the operation or movement of the sunroof panel 2.

First of all, at step S201, the current conditions of the respective Hall-ICs 11 and 12 are detected. At next step S202, the sandwiched condition threshold value (cf. FIG. 2) is set depending on the current position of the sunroof panel 2. Specifically, if the sunroof panel 2 is positioned in the slide interval-1 and the slide interval-2, the threshold values 'A' and 'B' are set, respectively. If the sunroof panel 2 is positioned in one of other intervals, the sandwiched condition prevention function is locked. The threshold values 'A' and 'B' are set by using the current battery voltage as a parameter so that the threshold values 'A' and 'B' depend thereon.

At next step S203, the relay driving circuit 14 turns on the relay 15, thereby driving the motor 4 in a reverse direction. At step S204, the timer 33 is started or initiated. The timer 33 is used for detecting a motor locked condition resulting from the pinching of a portion of a human body, an object, or other things.

At steps S205 through S208, the occurrence of a rising edge or a falling edge is determined in either of the pulse train signals output from the respective Hall-ICs 11 and 12. If no edge is found in both of the pulse train signals output from the respective Hall-ICs 11 and 12, the program goes to step S213. If one of the pulse train signals output from the respective Hall-ICs 11 and 12s is found to have either a rising edge or a falling edge, the edge procedure is executed at each of steps S209 through S212 and the control then goes to step S213.

At step S213, whether the motor 4 is at rest (i.e. the relay 15 is OFF) is determined. If the result is true, S214 is executed in order to determine whether a time duration T2 has been passed after the termination of the driving of the motor 4. This is done based on the current value indicated by the timer 34. If the result is false, the control returns to step S205. If the result is true, the program returns to step S102 of the main routine after terminating the slide close procedure routine. It is to be noted that the time duration T2 is set as a summation of a) the time duration which is required for stopping the rotation of the motor 4 due to inertia after turning off the motor 4 (i.e. the relays 15 and 16 are turned OFF) and b) a small additional amount of time duration. On the other hand, at step S213, if the motor 4 is found not to be at rest, step S215 is executed for checking whether an edge is found this time. If no edge is detected, the program goes to step S216.

At step S216, whether the edge is found for a time duration T1 is determined. If no edge is found for the time duration T1, the motor locked condition is detected, which causes step S224 to be executed for issuing a command to reverse the driving direction of motor 4. Specifically, at step S224, the relay 15 and the relay 16 are turned OFF and ON, respectively, thereby reversing the rotation of the motor 4. On the other hand, if the time duration T1 has not been passed from the latest detection of the edge, the program returns to step S205.

On the other hand, if the edge is found at step S215, step S217 is executed to determine whether the current position of the sunroof panel 2 is at D4 based on the indication of the position counter 32. If the position is at D4, the sunroof panel 2 is found to be in the fully closed position, which causes the program to go to step S219 for terminating the driving of the motor 4 (i.e. for turning the relay 15 OFF). On the other hand, if the sunroof panel 2 is not at D4, step S218 is executed to determine whether the close/up switch is ON. If the results indicate that the close/up switch is OFF, at step S219 the motor 4 is turned off (i.e. the relay 15 is turned OFF). If the close/up switch is found to be ON, the program goes to step S220.

At step S220, whether the sunroof 4 has made a cross-interval is determined. If the sunroof panel 2 has been moved to another interval, the program goes to step S221 for resetting the sandwiched condition threshold values and then goes to step S222. On the other hand, if the interval in which the sunroof panel 2 is positioned remains unchanged, the program goes to step S222 and keeps the threshold values unchanged.

At step S222, a cycle is calculated based on the latest edge and the currently detected edge, in other words, based on the value or time (a quarter cycle) indicated by the timer 33 upon detection of the current edge. At next step S223, whether the cycle is in excess of the sandwiched condition threshold value is determined. If so, step S224 is executed in order to execute the reverse operation routine. This reverse operation routine, though it will be detailed later with reference to FIG. 8, is mainly to reverse the rotation of the motor 4 by turning the relay 15 and the relay 16 OFF and ON, respectively. On the other hand, if the cycle is not in excess of the sandwiched condition threshold value, the program returns to step S205. It is to be noted that detecting the sandwiched condition can be made by monitoring a changing rate of the cycle. With this method, when the changing rate becomes larger than or is in excess of the threshold value, the sandwiched condition is recognized.

Next, with reference to FIG. 8, a detailed explanation of the reverse operation routine will be made.

At step S301, the motor 4, which is used for the slide close movement of the sunroof panel 2, is turned off by turning the relay 15 OFF. At step S302, the motor 4 is turned on in a reverse direction (i.e. slide open direction) by turning the relay 16 ON. At steps S303 through S306, whether the rising edge or the falling edge appears in each of the pulse train signals from the respective Hall-ICs 11 and 12 is determined. If no edge is found in both of the pulse train signals from the respective Hall-ICs 11 and 12, the program goes to step S311. If the edge is found in either of the pulse train signals from the respective Hall-ICs 11 and 12, the edge procedure is executed at each of steps S307 through S310. Then, the program goes to S311.

At step S311, whether the driving of the motor 4 is terminated (i.e. the relay 16 is turned off) is determined. If the motor 4 driving is terminated, a determination is made at Step S312 whether a time duration T2 has elapsed after stopping the motor 4 based on the indication of the timer 34. If time has not elapsed, the program control returns to step S303. If time has elapsed, the program returns to step S102 of the main routine after terminating the reverse operation routine. At step S311, if the motor 4 is found not to be at rest, step S313 is executed to determine whether an edge appears for the time duration T1. If the edge does not appear, the motor 4 is found to be in locked condition and the program control goes to step S316. At step S316, the motor 4 is made to rest by turning off the relay 16. At step S314, whether the current position of the sunroof panel 2 is at D1 is determined based on the indication of the position counter 32. If at D11, the sunroof panel 2 is found to be in the fully open stop position, which causes the program to go to step S316 to terminate operation of the motor 4 (i.e. to turn off the relay 16). If the current position is not at D11, step S315 is executed to determine whether the reverse stroke of the sunroof panel 2 is in excess of a predetermined value of e.g. about 20 cm. If in excess of the predetermined value, step S316 is executed to stop the motor 4 by turning off the relay 16. If not in excess of the predetermined value, the program control returns to step S303.

Thus, the sunroof panel 2 is at rest upon establishment of the fully opened condition of the sunroof after its reverse movement, upon establishment of one of the locked conditions of the motor 4, or upon termination of the predetermined reverse stroke of the sunroof panel 2. Until the time duration T2 elapses, the position detection procedure continues even after the termination of the motor 4 (i.e. even after the OFF condition of each of the relays 15 and 16). Thus, the rotation number of the motor 4 due to inertia after its termination can be counted for precisely detecting the position of the panel.

Next, the edge procedure (steps S209 through S212 in FIG. 6 and steps S307 through S310 in FIG. 8) which is made whenever the edge appears in one of the Hall-ICs 11 and 12 will be explained. Due to the fact that flowcharts illustrated in FIGS. 9 through 12 are similar, an explanation will only be given for when the rising edge appears in the pulse train signal from the Hall-IC 11. It is to be noted that the flowcharts illustrated in FIGS. 9 through 12, which are identical with procedures at steps S209 through S212 in FIG. 6, are used when the sunroof panel 2 is moved in the closing direction while the motor 4 is driven in a reverse direction and the relay 15 is turned ON.

First of all, at step S401, whether the edge is the first edge after starting up the control device is determined. If the edge is the first, the program goes to step S403 since determining an edge interval is impossible. If not the first edge, the control step S402 is executed to determine whether the edge interval is not greater than a time duration T3. The time duration T3 is set so as to be less than the value of a cycle which is obtained when the motor 4 is driven at its maximum possible speed while the sunroof panel 2 is under normal motion. If the edge interval is not greater than the time duration T3, this edge interval is neglected since this edge interval is due to noises and the program terminates the edge procedure. If the edge interval is found to be greater than the time duration T3, the program goes to step S403.

At step S403, whether the latest pulse train signal from the Hall-IC 11 is at L level is determined. If at L level, the edge is found to be normal in view of the output pattern of the Hall-IC which is illustrated in FIG. 4, which causes the program to go to step S404. If the pulse train signal is of H level, an abnormal condition is determined since (e.g. the edge is ignored due to a noise determination at step S402) the edge of the return side of the noise is detected as an edge. Thus, the determination causes the program to terminate the edge procedure by ignoring this edge. That is to say, when the reverse direction is detected (i.e. when the pulse train signal output from the Hall-IC 12 becomes HIGH level upon detection of the rising edge in the pulse train signal issued from the Hall-IC 11), though the mode is not switched to the reverse mode (i.e. the relay 15 remains ON), the signal (i.e. edge) which is the cause of the reverse detection is regarded as noise, thereby the position counter 32 is not incremented/decremented.

At step S404, since the edge is determined to be normal, the timer 33 is restarted. The timer 33 is used for the detection of the motor locking condition. At next step S405, whether the pulse train signal output from the Hall-IC 12 is at L level is determined. If at L level, this is indicative of the closing direction in view of the output patterns of the Hall-IC 12 which are illustrated in FIG. 4, which causes the program to go to step S406 for subtracting 1 from the value of the position counter 32 ('−1' decrement). If the result of step S405 indicates that the pulse train signal output from the Hall-IC 12 is at H level, which is indicative of the opening direction, the step S407 is executed for adding 1 to the value of the position counter 32 ('+1' increment). Each edge procedure, which follows the flowcharts illustrated in FIGS. 10 through 12, is identical with the aforementioned edge procedure in basic concept with the only differences being Hall-IC and signal level. Due to the fact that at steps S307 through S310 in FIG. 8 the sunroof panel edge procedure is moved in the opening direction, at steps S403, S503, S603, and S703, the level of the object signal is inverted.

As explained above, the distinction of the moving direction of the sunroof panel 2 is made based on the patterns of the output pulse train signals from the respective Hall-ICs 11 and 12 in addition to the energizing direction of the motor 4. Incrementing the position counter 32 is continued for a fixed time duration even though the motor 4 is turned off. Thus, even when the sunroof panel 2 is at rest or the motor 4 is driven due to inertia after termination of energizing the motor 4, the counting by the counter 32, for determining the current position of the sunroof panel 2, is made very accurate or precise. Moreover, noises superposed on the output pulse train signals of the Hall-ICs 11 and 12, respectively, can be eliminated. Thus, it is possible to establish a position control which is free from displacement without using a position sensor for the detection of the absolute position of the sunroof panel 2.

The present embodiment as detailed above can provide the following advantages or merits.

(1) On the basis of the pulse train signals issued from the pair of the Hall-ICs 11 and 12, respectively, which are out of phase, the direction (i.e. opening direction or closing direction) of the movement of the sunroof panel 2 is determined and the current position of the sunroof panel 2 is counted. Even though the motor 4 is brought into a stop mode by turning off both the relays 15 and 16, counting of the current position of the sunroof panel 2 is set to continue until the timer 34 indicates the time duration T2. Thus, the rotation of the motor 4 due to inertia, which moves the sunroof panel 2, can be counted. Therefore, detecting the current position of the sunroof panel 2 can be accurately made, thereby improving the position control of the sunroof panel 2 to a very precise degree.

(2) Even if the control is switched to the reverse mode by reversing the conditions of the relays 15 and 16, respectively, while the sunroof panel 2 is in movement (Steps S301 and S302), as long as the reverse movement of the sunroof panel 2 is not determined based on the two pulse train signals (steps S405 etc.), the position detection is continued assuming that the sunroof panel 2 is moving in the normal direction. Upon detection of the reverse movement of the sunroof panel 2, the position counting is initiated. Thus, detecting the position of the sunroof panel 2 becomes accurate or precise.

(3) If the comparison of the two pulse train signals indicates the reverse movement of the sunroof panel 2 though no command is issued to the motor to establish the reverse mode for reversing the sunroof panel 2, the signal (edge) which results in the detection of the reverse is ignored or treated as a noise, which makes it possible to avoid the position counter 32 counting the noise. Thus, determining the position of the sunroof panel 2 can be precisely made.

(4) If the pulse cycle, which is calculated based on the indication of the timer 33, is much smaller than the predetermined value and is also an unexpected value, the signal (edge) is ignored as a noise. This makes it possible to void the position counter 32 counting by mistake, thereby making the position detection of the sunroof panel 2 precise. Thus, very precise position control of the sunroof panel 2 can be established.

(5) The foregoing advantages (1) through (4) ensure the correct or accurate detection of the current position of the sunroof panel 2, which makes it possible to avoid using a position detection sensor or position correction sensor. Thus, the device becomes much simpler in structure, and compact and the procedure of the microcomputer 13 for the position detection is made much simpler.

(6) Based on the pulse train signal, the sandwiched condition caused by the sunroof panel 2 is detected. That is, the sandwiched condition is recognized to occur immediately when the pulse cycle, calculated from the indication of the timer 33, becomes in excess of a predetermined value. Thus, each of the Hall-ICs 11 and 12 is available as both position detecting and sandwiched condition detecting devices. Thus, no additional device is required solely for the purpose of detecting the sandwiched condition. In brief, only the Hall-ICs 11 and 12 enables the control device to have the sandwiched condition prevention function.

(7) In the sandwiched condition detection procedure, if the next signal (edge) fails to appear within the time duration T1, an occurrence of the sandwiched condition is recognized. Thus, detecting the sandwiched condition can be made in precise fashion even though a pulse cycle cannot be detected due to the fully locked condition of the motor 4.

(8) The timer 33 is used as both the pulse cycle clocking device for calculating the pulse cycle and the device for noise treatment, which makes it possible to reduce the number of the counters used as a timer. The counting operation at the CPU 30 becomes much simpler or easier.

It is to be noted that the foregoing embodiment is not restrictive to the above components or description and therefore other modes or embodiments can be realized as follows:

The noise treatment can be omitted. Detecting the position of the sunroof panel 2 can be accurately made by counting the position while the motor 4 rotates due to inertia despite deenergization of the motor 4 or by employing a method in which the counting direction is reversed after confirmation of the actual reverse movement of the motor 4.

When the lid is in the form of a power-operated window pane, the control device can be used for controlling the power-operated window pane. In such a case, the position of the window pane can be precisely detected by a pair of rotation number sensors. Of course, a sensor for the position correction can be used, which makes it possible to increase the position detection precision or accuracy.

The control device can be established without the sandwiched condition prevention function. In even this case, of course, determining the position of the lid, such as the sunroof panel 2, can be accurately made.

Three or more Hall-ICs can be used instead of the two Hall-ICs 11 and 12 shown in the embodiment. At least two rotation number sensors satisfy the establishment of the control device.

Though in the aforementioned embodiment the sunroof panel 2 is being moved while the operation switch 23 is being pushed, a switch of another type which continues to its ON condition, which to established only by being touched instantaneously, can be used.

The rotation number sensors are not limited to Hall-ICs. For example, limit switches, proximate switches, photo couplers and other devices/means are available as long as each of the sensors is capable of producing or generating a pulse train signal which is in response to the rotation number of the motor 4. The output signal of the sensor can be in analogue mode. The analogue signal can be digitized by an A/D converter before being input to the CPU 30.

An object, on which this control device is mounted, is not limited to an automotive vehicle. Other objects, such as another vehicle or a building which has an opening to be closed or opened by a lid, can be mounted with the control device.

The invention has thus been shown and described with reference to a specific embodiment, however, it should be understood that the invention is in no way limited to the details of the illustrated structures but changes and modifications may be made without departing from the spirit and scope of the appended claims.

What is claimed is:

1. An open/close control device for a movable lid which opens and closes an opening comprising:
   a motor for driving the lid;
   a pair of rotation number detection sensors which generate pulse train signals, respectively, the pulse train signals being of a frequency which is in proportion to a rotation number of the motor but being differed in phase; and
   position detection means for determining a movement direction of the lid and for detecting a position of the lid based on the pulse train signals, respectively, the position detection means being operated to continue the detection of the position of the lid for a predetermined time duration after the motor is deenergized for stopping the movement of the lid.

2. An open/close control device as set forth in claim 1, wherein the position detection means continues to detect the position of the lid in a positive direction of the motor unless a movement in a reverse direction of the lid is detected, when the motor is driven to move the lid in the reverse direction.

3. An open/close control device as set forth in claim 2, further comprising:
   a sandwiched condition detection means for detecting a sandwiched condition, caused by the lid and an object, based on the pulse train signal.

4. An open/close control device as set forth in claim 3, wherein the lid is a sunroof panel of a vehicle which opens and closes an opening of a vehicle roof.

5. An open/close control device as set forth in claim 3, wherein the sandwiched condition detection means recognizes the sandwiched condition if a subsequent edge of the pulse train signal fails to appear within a time duration after a detection of an edge of the pulse train signal.

6. An open/close control device as set forth in claim 1, further comprising:
   a sandwiched condition detection means for detecting a sandwiched condition, caused by the lid and an object, based on the pulse train signal.

7. An open/close control device as set forth in claim 6, wherein the lid is a sunroof panel of a vehicle which opens and closes an opening of a vehicle roof.

8. An open/close control device as set forth in claim 6, wherein the sandwiched condition detection means recognizes the sandwiched condition if a subsequent edge of the pulse train signal fails to appear within a time duration after a detection of an edge of the pulse train signal.

9. An open/close control device as set forth in claim 1, wherein the predetermined time duration is set as a time duration which is required for stopping rotation of the motor through inertia after turning off the motor.

10. An open/close control device for a movable lid which opens and closes an opening comprising:
   a motor for driving the lid;
   a pair of rotation number detection sensors which generates pulse train signals, respectively, the pulse train signals being in proportion to a rotation number of the motor but being differed in phase; and
   position detection means for determining a movement direction of the lid and for detecting a position of the lid based on the pulse train signals, respectively, the position detection means determining that the pulse train signal, which is used for detecting the reverse movement of the lid, is a noise when a) the motor is driven one of to stop and to a positive movement of the lid and b) the reverse movement of the lid is detected by the position detection means.

11. An open/close control device as set forth in claim 10, further comprising:
   a sandwiched condition detection means for detecting a sandwiched condition, caused by the lid and an object, based on the pulse train signal.

12. An open/close control device as set forth in claim 11, wherein the lid is a sunroof panel of a vehicle which opens and closes an opening of a vehicle roof.

13. An open/close control device as set forth in claim 11, wherein the sandwiched condition detection means recognizes the sandwiched condition if a subsequent edge of the pulse train signal fails to appear within a time duration after a detection of an edge of the pulse train signal.

14. An open/close control device for a movable lid which opens and closes an opening comprising:
   a motor for driving the lid:
      at least a pair of rotation number detection sensors which generate pulse train signals, respectively, the pulse train signals being of a frequency which is in proportion to a rotation number of the motor but being differed in phase;
   position detection means for determining a movement direction of the lid and for detecting a position of the lid based on the pulse train signals, respectively, the position detection means includes clocking means for counting a cycle of the pulse train signal, the position detection means determining the pulse train signal is a noise when the cycle of the pulse train signals is determined to be smaller than a predetermined value; and
   a sandwiched condition detection means for detecting a sandwiched condition, caused by the lid and an object, based on the pulse train signal, the sandwiched condition detection means recognizing the sandwiched condition if a subsequent edge of the pulse train signal fails to appear within a time duration after a detection of an edge of the pulse train signal.

* * * * *